United States Patent [19]

Wright

[11] 4,258,145
[45] Mar. 24, 1981

[54] TERNARY POLYMER BLENDS

[75] Inventor: Roy F. Wright, Bartlesville, Okla.

[73] Assignee: Phillips Petroleum Company, Bartlesville, Okla.

[21] Appl. No.: 75,448

[22] Filed: Sep. 14, 1979

[51] Int. Cl.³ .............................................. C08L 53/02
[52] U.S. Cl. ...................................... 525/99; 525/98; 525/89
[58] Field of Search ............................. 525/99, 98, 89

[56] References Cited

U.S. PATENT DOCUMENTS

| | | | |
|---|---|---|---|
| 3,123,583 | 3/1964 | Howard et al. | 260/5 |
| 3,445,543 | 5/1969 | Gruver | 260/876 |
| 3,451,962 | 6/1969 | Auler et al. | 260/33.6 |
| 3,459,830 | 8/1969 | Legge et al. | 525/98 |
| 3,492,371 | 1/1970 | Barret | 260/889 |
| 3,562,790 | 2/1971 | Coover et al. | 260/876 |
| 3,630,974 | 12/1971 | Lodocsi et al. | 260/5 |
| 3,646,168 | 2/1972 | Barrett | 260/889 |
| 3,658,732 | 4/1972 | Baldi et al. | 260/5 |
| 3,758,643 | 9/1973 | Fischer | 260/897 |
| 3,821,152 | 6/1974 | Cornell et al. | 260/33.6 AQ |
| 3,904,470 | 9/1975 | Fukuki et al. | 156/306 |
| 3,962,018 | 6/1976 | Costemalle et al. | 156/306 |
| 4,089,820 | 5/1978 | Wright | 260/5 |
| 4,140,732 | 2/1979 | Schnetger et al. | 260/876 B |

OTHER PUBLICATIONS

Haws et al., "Compounding Radial Block Polymers", Rubber World, vol. 167, No. 4, Jan. 1973, pp. 27–32.
Ossefort et al., "Ethylene-Propylene Rubbers", Rubber Age, Sep. 1969, vol. 101, No. 9, pp. 47–60.
Vanderbilt, "The Vanderbilt Rubber Handbook" (1978) pp. 152–153.

Primary Examiner—Carman J. Seccuro

[57] ABSTRACT

A thermoplastic composition comprising 30 to 90 weight percent of a block copolymer formed from a conjugated diene and a monovinylarene, 5 to 35 weight percent of an ethylene-propylene-nonconjugated diene terpolymer, and 5 to 30 weight percent of a thermoplastic polyolefin. The blend exhibits good distortion resistance, solvent resistance, high temperature retention of hardness, and ozone resistance.

18 Claims, No Drawings

TERNARY POLYMER BLENDS

FIELD OF THE INVENTION

This invention relates to improved polymer compositions. It further relates to blends containing a conjugated diene-monovinylarene copolymer, an ethylene-propylene-diene terpolymer and a polyolefin.

DESCRIPTION OF THE PRIOR ART

Conjugated diene-monovinylarene teleblock copolymer compositions are useful in the production of molded articles having elastomeric properties. Such compositions are subject to attack by ozone with resulting embrittlement and cracking of the molded articles. For certain uses, the compositions must display good solvent resistance and good distortion resistance in addition to ozone resistance. It is known that ethylene-propylene-diene terpolymers (EPDM terpolymers) are effective in improving the ozone resistance of conjugated diene-monovinylarene teleblock copolymers. However, for many applications the resulting elastomeric compositions lack the desired solvent resistance and high-temperature distortion resistance.

Therefore, it is an object of this invention to provide a processable thermoplastic elastomer composition which exhibits the properties of high-temperature distortion resistance, solvent resistance, and ozone resistance.

SUMMARY OF THE INVENTION

According to the invention, a ternary blend comprising 30 to 90 weight percent conjugated diene-monovinylarene teleblock copolymer, 5 to 35 weight percent ethylene-proplyene-nonconjugated diene terpolymer, and 5 to 50 weight percent thermoplastic polyolefin is provided. The blend is processable, has good ozone resistance, and is capable of being used without curing or vulcanization, and in addition has the qualities of good distortion resistance, solvent resistance, and high temperature retention of hardness.

DETAILED DESCRIPTION OF THE INVENTION

The conjugated diene-monovinylarene copolymers for use in the invention are those linear or branched teleblock copolymer elastomeric materials possessing thermoplastic characteristics; i.e., they have high green tensile strength and can be molded into useful rubber objects without vulcanization. The teleblock copolymers of the invention can be represented by the general formula A—B—A or $(AB)_nY$, where A represents a block of polymerized monovinylarene monomer, B represents a block of polymerized conjugated diene units or alternatively a random or random tapered block copolymer of conjugated diene and monovinylarene monomers, Y is the residual unit from a polyfunctional coupling agent or a polyfunctional initiating species, and n has a value of from 2 to 6. The A—B—A polymers have a linear structure produced by sequential polymerization of the A segment (monovinylarene) followed by the B segment (conjugated diene, or random or random-tapered conjugated diene-monovinylarene) followed by the other A segment. The polymer represented by $(AB)_nY$ can be prepared using a polyfunctional initiator. Alternatively, it can be prepared using an initiator such as n-butyllithium by first initiating the polymerization of a monovinylarene monomer followed by polymerization of the conjugated diene monomer, and then adding a coupling agent having two or more coupling sites to give a linear or radial polymer. Such techniques are disclosed, for example, in U.S. Pat. Nos. 3,251,905, 3,281,383 and 3,639,521, the disclosures of which are hereby incorporated by reference.

When Y is a residue of a polyfunctional coupling agent, it is derived from treating agents containing from 2 to 6 functional groups per molecule. Useful polyfunctional coupling agents include multiepoxides, multiimines, multiisocyanates, multialdehydes, multiketones, multiesters, multianhydrides and multihalides. Specific examples of such agents include benzene-1,4-diisocyanate, naphthalene-1,2,5,7-tetraisocyanate, tri(1-aziridinyl)phosphine oxide, epoxidized soybean oil, epoxodized linseed oil, 1,4,7-naphthalene tricarboxyaldehyde, 1,4,9,10-anthracenetetrone, pyromellitic dianhydride, trimethyl tricarballylate, dichlorodimethylsilane and silicon tetrachloride.

When Y is a residue of a polyfunctional initiator, it is derived from compounds of general formula $R(Li)_x$ where x is an integer of from 2 to 6 to R is an aliphatic, cycloaliphatic or aromatic radical containing from 1 to 20 carbon atoms. Specific examples of useful polyfunctional initiators include dilithiomethane, 1,4-dilithiobutane, 1,20-dilithioeicosane, 1,2-dilithio-1,2-diphenylethane, 1,4-dilithiocyclohexane, 1,3,5-trilithiopentane, 1,2,5-trilithionaphthalene, 1,3,5,8-tetralithiodecane and 1,2,3,5-tetralithiocyclohexane.

While a distinction has been made herein between A—B—A polymers made by sequential monomer addition and $(AB)_nY$ polymers, which would be linear when n is 2 and radial when n is greater than 2, the art sometimes makes no such distinction since the physical properties are generally essentially identical for both A—B—A and $(AB)_2Y$ polymers.

The copolymers used in the invention composition are referred to as "teleblock" rubbers because each branch of the polymer molecule has the same type of terminal block. As defined above, the teleblock copolymers used in the invention have at least two terminal resinous blocks and a central rubbery block.

Conjugated dienes useful in the preparation of the linear and branched teleblock copolymers are generally those containing 4 to about 12 carbon atoms per molecule, preferably those containing 4 to about 8 carbon atoms per molecule. Examples of conjugated dienes which can be used include 1,3-butadiene, isoprene, 2,3-dimethyl-1,3-butadiene, piperylene, 3-butyl-1,3-octadiene, 2-phenyl-1,3-butadiene, and mixtures thereof. Especially preferred, because of its availability and cost, is 1,3-butadiene.

The monovinylarene monomers which are used in the preparation of the teleblock copolymers are those containing from 8 to about 20 carbon atoms per molecule. Examples of suitable monovinylarene monomers include styrene, α-methylstyrene, p-vinyltoluene, p-t-butylstryene, and mixtures of these.

The useful teleblock copolymers generally contain from 50 to 90, preferably from 55 to 80, weight percent polymerized conjugated diene with the balance being polymerized monovinylarene. Weight average molecular weights of the copolymers for use in the invention are generally in the range of about 50,000 to 750,000, preferably in the range of about 75,000 to 300,000, as determined from gel permeation chromatography curves and intrinsic viscosities by a method described in G. Kraus and C. J. Stacy, J. Poly. Sci. A-2, 10, 657 (1972) and G. Kraus and C. J. Stacy, J. Poly. Sci.: Symposium No. 43, 329 (1973).

The EPDM terpolymers suitable for use in the composition of the invention are rubbery, vulcanizable terpolymers of ethylene, propylene and nonconjugated diene monomers. The molar ratio of ethylene to propylene will generally be in the range of about 90:10 to about 50:50 and will preferably be in the range of about 85:15 to about 60:40. The diene comonomer will generally be present in an amount of 0.5 to 10, preferably about 1 to about 2.5, mole percent, based on the total moles of propylene and ethylene. The diene comonomer can be any monomer which has 2 nonconjugated olefinic double bonds and which is copolymerizable with ethylene and propylene. The hydrocarbyldiolefins having 5 to about 12 carbon atoms, per molecule are presently preferred. Examples of suitable diene comonomers include dicyclopentadiene, 1,4-hexadiene, 5-methylene-2-norbornene, 5-ethylidene-2-norbornene, 1,5-cyclooctadiene, and mixtures of these. The techniques for preparation of the terpolymer are well known in the art, for example U.S. Pat. No. 3,914,478, the disclosure of which is hereby incorporated by reference.

The thermoplastic olefin resins suitable for use in the invention are solid, resinous plastic materials made by polymerizing ethylene or propylene. Polyethylene of low density (e.g., 0.910–0.925 g/cc), medium density (0.926–0.940 g/cc) or high density (greater than 0.940 g/cc) may be used, and it may be prepared by either high or low pressure processes. Polypropylene in highly crystalline isotactic form, particularly that having a density of from 0.900–0.910 g/cc, or in syndiotactic form is also suitable. Crystalline block copolymers of ethylene and propylene can also be used.

The composition of the ternary blends of the invention comprises 30 to 90 weight percent conjugated diene-monovinylarene copolymer, preferably 50 to 80 weight percent; 5 to 35 weight percent ethylene-propylene-diene terpolymer, preferably 10 to 25 weight percent; and 5–50 weight percent polyolefin, preferably 10 to 25 weight percent, all based upon the weight of the polymer constituents of the blend.

The preferable method of mixing the three polymer constituents of the blend is a hot mixing process such as is provided by use of a roll mill or a Banbury mixer, although any appropriate blending or mixing means may be used.

Conventional additives may be added to the invention compositions depending upon the use intended for the compositions. These additives include, for example, fillers, reinforcing agents, plasticizers, extenders, pigments, stabilizers, and processing aids.

The compositions of the invention have high green tensile strength, good high temperature distortion resistance, good solvent resistance, good high temperature retention of hardness, and good ozone resistance, and they are suitable for many uses without vulcanization. They have application as molded articles such as shoe soles, toys, and containers, and can also be employed in the manufacture of tires, gaskets, and many other elastomeric articles. They can also be used in pressure-sensitive adhesives and sealing and caulking compositions.

EXAMPLE I

Table I summarizes the conditions and results of comparative runs showing the relative hardness, distortion resistance, oil resistance, and ozone resistance of a ternary blend of a 70/30 butadiene-styrene radial teleblock copolymer, an EPDM terpolymer and polyethylene, and comparison blends. The blends were prepared by melt blending in a B Banbury mixer for 2 to 5 minutes at 149°–154° C. dump temperature and then sheeting off on a roll mill. The blends were compression molded at 182° C. into rest specimens on which the following data were obtained.

TABLE I

| | Run No. | | | |
|---|---|---|---|---|
| | 1 | 2 | 3 | 4 |
| Radial Teleblock Copolymer,[a] wt. % | 60 | 100 | 75 | 80 |
| EPDM,[b] wt. % | 20 | 0 | 25 | 0 |
| Polyethylene,[c] wt. % | 20 | 0 | 0 | 20 |
| Kemamide B,[d] php[e] | 1 | 1 | 1 | 1 |
| Tensile (25° C.), MPa[f] | 13.2 | 17.6 | 17.0 | 12.3 |
| Hardness, Shore A (25° C.)[g] | 80.5 | 60 | 60 | 70 |
| Hardness, Shore A (100° C.)[g] | 30 | 15 | 13 | 22 |
| Distortion, % (100° C.)[h] | 18 | 83 | 87 | 71 |
| Oil Resistance,[i] % swell after 22 hours at 25° C. | | | | |
| ASTM Oil #1 | 7.1 | 14 | 14 | 10 |
| ASTM Oil #3 | 53 | 83 | 85 | 79 |
| ASTM Fuel A | 155 | 193 | 373 | 155 |
| ASTM Fuel B | 67 | (j) | (j) | (j) |
| Ozone Resistance,[k] 1 day | 0/0/0 | X/X/X | 0/10/10 | X/X/X |

[a]Butadiene-styrene (70/30) radial teleblock copolymer having a weight average molecular weight of 149,000, prepared by initiating polymerization with n-butyllithium and coupling with silicon tetrachloride.
[b]EPsyn 5508 from Copolymer Rubber having a specific gravity of 0.860 Mooney viscosity (ML 1 + 8 at 250° F.) of 55 and 5-ethylidene-2-norbornene as the diene monomer.
[c]A commercial high density (0.967 g/cc; ASTM D 1505-68) polyethylene homopolymer having a melt index of 30 (ASTM D 1238-73).
[d]Amide-based processing aid from Humko-Sheffield Chemical Co.
[e]Parts by weight per 100 parts by weight of radial teleblock copolymer plus EPDM.
[f]ASTM D 412-75.
[g]ASTM D 2240-68.
[h]ASTM D 2633-76.
[i]ASTM D 471-75.
[j]Polymeric composition dissolved.
[k]Bent loops of 5"/4"/3" lengths exposed to 50 parts of ozone per hundred million parts of air for 1 day. Samples were rated on a scale of 0 to 10 based on visual examination of specimens, 0 designating no visual change, 10 designating severe cracking, and X designating failure of the specimen.

The data of Table I show the superior distortion resistance and solvent resistance of the ternary blend (run 1) compared to binary blends of EPDM or polyethylene with 70/30 butadiene-styrene radial teleblock copolymer (runs 3 and 4) and compared to 70/30 butadiene-styrene radial teleblock copolymer alone (run 2). In addition, the ternary blend exhibits good tensile strength, good ozone resistance, and, as shown by the Shore A hardness data, good high temperature retention of hardness. As can be seen from the comparative data, the addition of EPDM alone or polyethylene alone does not significantly improve the overall combination of properties of the butadiene-styrene copolymer, while the addition of a combination of EPDM and polyethylene results in a significant and unexpected improvement in the properties, particularly distortion resistance and solvent resistance.

EXAMPLE II

The EPDM terpolymer and the polyethylene of Example I were melt blended in a Midget Banbury mixer (3 to 10 minutes mixing time; 165°–175° C. dump temperature) with a butadiene-styrene radial teleblock copolymer having a lower molecular weight and a higher styrene content than the radial teleblock copolymer of Example I. Table II gives properties of test specimens compression molded at 153° C. from sheeted stock.

TABLE II

|  | Run No. | | | |
|---|---|---|---|---|
|  | 5 | 6 | 7 | 8 |
| Radial Teleblock Copolymer,[a] wt. % | 60 | 100 | 75 | 75 |
| EPDM,[b] wt. % | 20 | 0 | 25 | 0 |
| Polyethylene,[c] wt. % | 20 | 0 | 0 | 25 |
| Kemamide B,[d] php[e] | 1 | 1 | 1 | 1 |
| Tensile (25° C.), MPa[f] | 21.9 | 34.5 | 19.0 | 17.4 |
| Hardness, Shore A (25° C.)[g] | 93 | 92 | 85 | 95 |
| Hardness, Shore A (100° C.)[g] | 49 | 32 | 19 | 49 |
| Distortion, % (100° C.) | 14 | 87 | 84 | 60 |
| Oil Resistance, % swell after 22 hours at 25° C. |  |  |  |  |
| ASTM Oil #3 | 45 | 62 | 77 | 43 |
| ASTM Fuel A | 139 | 158 | 420 | 104 |
| ASTM Fuel B | 83 | (j) | (j) | (j) |
| Ozone Resistance[k] | 0/0/0 | X/X/X | 0/0/0 | 10/X/X |

[a]Butadiene-styrene (60/40) radial teleblock copolymer having a $M_w$ of 130,000 prepared by initiating polymerization with n-butyllithium and coupling with silicon tetrachloride.
[b]through (k) Same as corresponding footnotes in Table I.

The data of Table II confirm the significant and unexpected improvement in the distortion resistance and solvent resistance of the butadiene-styrene radial teleblock copolymer when both an EPDM terpolymer and polyethylene are added to the teleblock copolymer. The data also show that the resulting ternary blend has good green tensile strength, good ozone resistance, and good high temperature hardness.

EXAMPLE III

A ternary blend of 60/40 butadiene-styrene radial teleblock copolymer, an EPDM terpolymer and polypropylene, as well as comparison blends, were prepared by melt blending in a B Banbury mixer (3 to 6 minutes mixing time; 160°–180° C. dump temperature) and then sheeting off on a roll mill. The blends were compression molded at 182° C. into test specimens, the properties of which are recorded in Table III.

TABLE III

|  | Run No. | | | |
|---|---|---|---|---|
|  | 9 | 10 | 11 | 12 |
| Radial Teleblock Copolymer,[a] wt. % | 60 | 100 | 75 | 80 |
| EPDM,[b] wt. % | 20 | 0 | 25 | 0 |
| Polypropylene,[c] wt. % | 20 | 0 | 0 | 20 |
| Kemamide B,[d] php[e] | 1 | 1 | 1 | 1 |
| Tensile (25° C.), MPa[f] | 10.7 | 32.7 | 19.5 | 20.6 |
| Hardness, Shore A (25° C.)[g] | 93 | 91 | 86 | 94 |
| Hardness, Shore A (100° C.)[g] | 55 | 25 | 20 | 49 |
| Distortion, % (100° C.)[h] | 6.3 | 79 | 73 | 14 |
| Distortion, % (120° C.)[h] | 20 | 100 | 100 | 52 |
| Oil Resistance,[i] % swell after 22 hours at 25° C. |  |  |  |  |
| ASTM Oil #1 | 4.6 | 4.2 | 7.2 | 8.3 |
| ASTM Oil #3 | 44 | 65 | 76 | 56 |
| ASTM Fuel A | 176 | 152 | 300 | 124 |
| ASTM Fuel B | 55 | (j) | (j) | 38 |
| Ozone Resistance,[k] 1 day | 0/0/0 | 10/X/X | 0/0/0 | 0/10/10 |

[a]See footnote (a) of Table II.
[b]See footnote (b) of Table I.
[c]A commercial polypropylene having a nominal melt flow of 12 according to the procedure of ASTM D1238-73, condition L.
[d]through (k) Same as corresponding footnotes in Table I.

The data of Table III show the superior overall balance of properties, and particularly the superior distortion resistance, of the ternary blend compared to the binary blends and the radial teleblock copolymer alone.

EXAMPLE IV

A 70/30 butadiene-styrene radial teleblock copolymer, the EPDM terpolymer used in Example III, and the polypropylene used in Example III were melt blended in a BR Banbury mixer (2 to 7 minutes mixing time; 150°–190° C. dump temperature). Comparison blends were prepared in the same manner. After sheeting off on a roll mill, these blends were compression molded at 182° C. into test specimens, the properties of which are recorded in Table IV.

TABLE IV

|  | Run No. | | | |
|---|---|---|---|---|
|  | 13 | 14 | 15 | 16 |
| Radial Teleblock Copolymer,[a] wt. % | 60 | 100 | 75 | 80 |
| EPDM,[b] wt. % | 20 | 0 | 25 | 0 |
| Polypropylene,[c] wt. % | 20 | 0 | 0 | 20 |
| Kemamide B,[d] php[e] | 1 | 1 | 1 | 1 |
| Tensile (25° C.), MPa[f] | 9.4 | 17.6 | 17.0 | 8.6 |
| Hardness, Shore A (25° C.)[g] | 73.5 | 60 | 60 | 81 |
| Hardness, Shore A (100° C.)[g] | 52.5 | 42 | 33 | 62 |
| Distortion, % (100° C.)[h] | 19 | 83 | 87 | 16 |
| Distortion, % (120° C.)[h] | 42 | 98 | 97 | 47 |
| Oil Resistance, % swell after 22 hours at 25° C. |  |  |  |  |
| ASTM Oil #1 | 7.6 | 14 | 14 | 7.3 |
| ASTM Oil #3 | 57 | 83 | 85 | 58 |
| ASTM Fuel A | 193 | 193 | 373 | 146 |
| ASTM Fuel B | 82 | (j) | (j) | 17 |
| Ozone Resistance,[k] 1 day | 0/6/10 | X/X/X | 0/10/10 | 4/6/10 |

[a]See footnote (a) of Table I.
[b]through (k) Same as corresponding footnotes in Table III.

Table IV illustrates the superior overall balance of properties of the blend of the invention (run 13) as compared with the comparison blends.

I claim:
1. A polymer blend comprising:
   30 to 90 weight percent, based on the weight of the polymer constituents of the blend, of a conjugated diene-monovinylarene block copolymer of the form A—B—A or (AB)$_n$Y, where A represents a block of polymerized monovinylarene monomer, B represents a block of polymerized conjugated diene units, Y is a residual unit of a polyfunctional coupling agent or a polyfunctional initiator, and n is 2, 3, 4, 5 or 6;
   5 to 35 weight percent of an ethylene-propylene-nonconjugated diene terpolymer; and
   5 to 50 weight percent of a thermoplastic polyolefin.
2. The polymer blend of claim 1 in which the conjugated diene-monovinylarene block copolymer is present in an amount of from 50 to 80 weight percent of the polymer constituents of the blend, the ethylene-propylene-nonconjugated diene terpolymer is present in an amount of from 10 to 25 weight percent, and the thermoplastic polyolefin is present in an amount of from 10 to 25 weight percent.
3. The polymer blend of claim 2, in which the conjugated diene is selected from 1,3-butadiene and isoprene; the monovinylarene is selected from styrene and 2-methylstyrene; and the thermoplastic polyolefin is selected from polyethylene, polypropylene and crystalline block copolymers of ethylene and propylene.

4. The polymer blend of claim 2 in which the conjugated diene is 1,3-butadiene, the monovinylarene is styrene, the block copolymer contains 50 to 90 weight percent conjugated diene, and the thermoplastic polyolefin is selected from polyethylene and polypropylene.

5. The polymer blend of claim 2 in which B represents a random or random tapered block of polymerized conjugated diene and monovinylarene monomers.

6. The polymer blend of claim 3 in which the ethylene-propylene-nonconjugated diene terpolymer contains a molar ratio of ethylene to propylene in the range of 90:10 to 50:50 and the diene comonomer is present in an amount of 0.5 to 10 mole percent based on total moles of ethylene and propylene.

7. The polymer blend of claim 3 in which the ethylene-propylene-nonconjugated diene terpolymer is ethylene-propylene-5-ethylidene-2-norbornene.

8. The polymer blend of claim 3 in which the weight average molecular weight of the block copolymer is within the range of about 75,000 to about 300,000.

9. The polymer blend of claim 1 further comprising at least one ingredient selected from the group of a filler, a reinforcing agent, a plasticizer, an extender, a pigment, a stabilizer, and a processing aid.

10. The polymer blend of claim 2 in which the conjugated diene-monovinylarene block polymer is present in an amount of about 60 weight percent based on the weight of the polymer constituents of the blend, the ethylene-propylene-nonconjugated diene is present in an amount of about 20 weight percent, and the thermoplastic polyolefin is present in an amount of about 20 weight percent.

11. The polymer blend of claim 2 in which the conjugated diene-monovinylarene block copolymer is present in an amount of about 60 weight percent based on the weight of the polymer constituents of the blend, the ethylene-propylene-nonconjugated diene is present in an amount of about 20 weight percent, and the thermoplastic polyolefin is present in an amount of about 20 weight percent.

12. The polymer blend of claim 4 in which the conjugated diene-monovinylarene block copolymer is present in an amount of about 60 weight percent based on the weight of the polymer constituents of the blend, the ethylene-propylene-nonconjugated diene is present in an amount of about 20 weight percent, and the thermoplastic polyolefin is present in an amount of about 20 weight percent.

13. The polymer blend of claim 4 in which the thermoplastic polyolefin is polyethylene.

14. The polymer blend of claim 13 in which the weight average molecular weight of the block copolymer is within the range of about 75,000 to about 300,000.

15. The polymer blend of claim 14 in which the polyethylene has a density greater than about 0.940 g/cc.

16. The polymer blend of claim 1 in which the thermoplastic polyolefin is polyethylene having a density greater than about 0.940 g/cc.

17. The polymer blend of claim 3 in which the thermoplastic polyolefin is a crystalline block copolymer of ethylene and propylene.

18. The polymer blend of claim 4 in which the thermoplastic polyolefin is polypropylene.

* * * * *

UNITED STATES PATENT AND TRADEMARK OFFICE
CERTIFICATE OF CORRECTION

PATENT NO. : 4,258,145
DATED : March 24, 1981
INVENTOR(S) : Roy F. Wright

It is certified that error appears in the above-identified patent and that said Letters Patent are hereby corrected as shown below:

Column 6, lines 65 and 66 (claim 3), delete "2-methylstyrene" and substitute therefor --- α-methylstyrene ---.

Signed and Sealed this

Seventeenth Day of August 1982

[SEAL]

Attest:

GERALD J. MOSSINGHOFF

Attesting Officer   Commissioner of Patents and Trademarks